US006149754A

United States Patent [19]

Ogata et al.

[11] Patent Number: 6,149,754

[45] **Date of Patent: *Nov. 21, 2000**

[54] REPRODUCED IMAGE PRODUCT AND A METHOD OF FORMING A REPRODUCED IMAGE LAYER

[75] Inventors: Kentaro Ogata, Toyota; Motohito Nakashima, Nagoya; Akira Suzuki, Toyota; Kyoji Inoue, Nagoya; Hideo Haga, Seto; Keiji Miyatake, Sanda; Tsutomu Nagasao, Toyono-gun; Takeshi Tomiyama, Hiratsuka, all of Japan

[73] Assignees: Toyota Jidosha Kabushiki Kaisha, Toyota; Kansai Paint Company Limited, Amagasaki, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,809

[22] Filed: Jun. 19, 1996

[30] Foreign Application Priority Data

| | | | |
|---|---|---|---|
| Jun. 27, 1995 | [JP] | Japan | 7-160300 |
| Jun. 27, 1995 | [JP] | Japan | 7-160314 |

[51] Int. Cl.[7] .......... B44C 1/175; B32B 31/20; B32B 31/22; B41M 3/12

[52] U.S. Cl. .......... 156/241; 156/230; 156/240; 156/236; 156/237; 156/247; 156/277; 156/289; 427/146; 427/147; 427/148; 428/914

[58] Field of Search .......... 428/195, 411.1, 428/204, 205, 914; 427/337, 336, 146, 147, 149; 156/230, 236, 237, 240, 241, 247, 277, 289

[56] References Cited

U.S. PATENT DOCUMENTS

| | | | |
|---|---|---|---|
| 406,519 | 7/1889 | Fox | 156/241 |
| 470,899 | 3/1892 | Robinson | 156/241 |
| 5,104,721 | 4/1992 | Sun | 428/195 |

FOREIGN PATENT DOCUMENTS

| | | | |
|---|---|---|---|
| 0 241 213 | 1/1987 | European Pat. Off. . | |
| 0 318 230 | 11/1988 | European Pat. Off. . | |
| 0 375 823 | 12/1988 | European Pat. Off. . | |
| 0 379 598 | 12/1988 | European Pat. Off. . | |
| 379598A1 | 8/1990 | European Pat. Off. | C08G 18/40 |
| 5-162434 | 6/1993 | Japan . | |
| 5-162435 | 6/1993 | Japan . | |
| 6-15974 | 1/1994 | Japan . | |

OTHER PUBLICATIONS

Seymour, E.B., "Solubility Parameters of Organic Compounds", Handbook of Chemistry and Physics, 56th edition, Robert C. Weast, ed., Pp. C–720 to C–726, 1975.

*Primary Examiner*—James Sells
*Assistant Examiner*—J. A. Lorengo
*Attorney, Agent, or Firm*—Armstrong, Westerman, Hattori, McLeland & Naughton

[57] ABSTRACT

A method of forming reproduced in images on the surface of cured coating, the method including the steps of treating a surface of a cured coating with an organic solvent which does not dissolve the cured coating, but slightly dissolves a reproduced image layer and has a solubility parameter of about 7.5 to about 8.2, superposing, over the cured coating, a copying sheet which comprises a copy support having a reproduced image layer formed thereon to bring the reproduced image layer of the copying sheet into contact with the organic solvent-treated surface of cured coating, heat-transferring the reproduced image to the treated surface of cured coating, releasing the copy support to provide a transfer product on the cured coating, and forming a clear coating on the surface of the transfer product.

5 Claims, 3 Drawing Sheets

TRANSFER PRODUCT (i)

COPYING SHEET

TRANSFER PRODUCT (i)

TRANSFER PRODUCT (ii)

TRANSFER PRODUCT (iii)

TRANSFER PRODUCT (iv)

TRANSFER PRODUCT (v)

TRANSFER PRODUCT (vi)

TRANSFER PRODUCT (vii)

REPRODUCED IMAGE PRODUCT AND A METHOD OF FORMING A REPRODUCED IMAGE LAYER

BACKGROUND OF THE INVENTION

1. Technical Field

The present invention relates to reproduced image products and a novel method of forming a layer of reproduced images on the surface of cured coating film.

2. Description of the Related Art

A method is known for forming a reproduced image layer on a substrate by heat transfer from a copying sheet comprising a copy support with images reproduced thereon from a pattern or the like using a color copying machine, the method comprising heat-transferring the reproduced images to a primer coating on the substrate, such as a tile, slate, plastics sheet or the like, releasing the copy support and applying a curable clear coating composition (Japanese Unexamined Patent Publication No. 162435/1993).

However, when said method is conducted on the surface of cured coating, as on an automotive cured coating, problems arise. Silicone is deposited on a copy support in forming a reproduced image layer thereon using a copying machine. Thereafter the silicone becomes attached to a primer coating or the reproduced images during heat transfer, thereby impairing the adhesion between the reproduced images and the primer coating or clear coating. As a result, the reproduced images or clear coating would readily come off from the primer coating due to an external force (scratching, collision, etc.), rain or like external factors, resulting in the decrease of durability. A further drawback is that cratering is created over the clear coating formed on the primer coating or on the reproduced image layer, deteriorating the finished appearance. For these reasons, it has been difficult to apply said method to the surface of cured coating.

SUMMARY OF THE INVENTION

An object of the present invention is to provide novel reproduced image products free of said prior art drawbacks.

Another object of the invention is to provide a method capable of forming, on a cured coating, a reproduced image layer which is excellent in finished appearance, aesthetic property and durability.

Other objects and features will become more apparent from the following description.

According to the present invention (first invention), there are provided a reproduced image product comprising a cured coating, a reproduced image layer and a clear coating of isocyanate-curing cellulose acetate butyrate-modified acrylic resin as laminated in this order (image reproduction I), and a method of forming reproduced images on the surface of cured coating, the method comprising the steps of superposing, over a cured coating, a copying sheet which comprises a copy support having a reproduced image layer formed thereon to bring the reproduced image layer of the copying sheet into contact with the surface of the cured coating, heat-transferring the reproduced images to the surface of cured coating, releasing the copy support to provide a transfer on the cured coating, and forming a clear coating of isocyanate-curing cellulose acetate butyrate-modified acrylic resin on the surface of the transfer.

According to the present invention (second invention), there are also provided a reproduced image product comprising a cured coating having a surface treated with an organic solvent of about 7.5 to about 8.2 in solubility parameter, a reproduced image layer and a clear coating as laminated in this order (image reproduction II), and a method of forming reproduced images on the surface of cured coating, the method comprising the steps of treating a surface of the cured coating with an organic solvent of about 7.5 to about 8.2 in solubility parameter, superposing, over a cured coating, a copying sheet which comprises a copy support having a reproduced image layer formed thereon to bring the reproduced image layer of the copying sheet into contact with the organic solvent-treated surface of cured coating, heat-transferring the reproduced images to the treated surface of cured coating, releasing the copy support to provide a transfer on the cured coating, and forming a clear coating on the surface of the transfer.

The inventors of the present invention conducted extensive research to provide an image reproduction free from said prior art drawbacks and found the following. When reproduced images are heat-transferred to the surface of cured coating, and then the clear coating of the specific modified acrylic resin is applied to the cured coating, or when reproduced images are heat-transferred after treating the surface of cured coating with a specific organic solvent, and a clear coating is applied, the adhesion of reproduced image layer to the cured coating is improved, the cratering of clear coating is prevented and the reproduced image layer which is excellent in finished appearance, aesthetic property and durability is formed.

The present invention has been completed based on these novel findings.

DETAILED DESCRIPTION OF THE PREFERRED EMBODIMENTS

First, the first invention is described below in more detail.

In the image reproduction I, it is desirable to interpose a resin layer for fixing the reproduced image between the cured coating and the reproduced image layer in order to further improve the adhesion of reproduced image layer. The finished appearance of the image reproduction I can be further enhanced by forming a clear coating on the clear coating of isocyanate-curing cellulose acetate butyrate-modified acrylic resin when so required.

Thus, according to a preferred embodiment of the first invention, there are provided an image reproduction I comprising a cured coating, a resin layer for fixing the reproduced image, a reproduced image layer, a first clear coating of isocyanate-curing cellulose acetate butyrate-modified acrylic resin and, when required, a second clear coating as laminated in this order, and a method of forming reproduced images on the surface of cured coating, the method comprising the steps of:

(1) applying a resin coating composition for fixing the reproduced image to the surface of cured coating and drying the coating until heat transfer becomes feasible, (2) superposing, over the dried coating, a copying sheet which comprises a copy support having reproduced images formed thereon to bring the reproduced image layer of the copying sheet into contact with the surface of the resin layer for fixing the reproduced image to provide a transfer product (i) comprising a cured coating, a resin layer for fixing the reproduced image, a reproduced image layer and a copy support as superposed in this order, (3) releasing the copy support from the transfer product (i) to give a transfer product (ii) comprising a cured coating, a resin layer for fixing the reproduced image, and a reproduced image layer as superposed in this order, (4) coating the reproduced image layer of the transfer product (ii) with an isocyanate-curing cellulose acetate butyrate-modified acrylic resin clear coating composition, drying the coating and forming a first clear coating on the transfer product (ii) to give a transfer product (iii), and (5) further applying a clear coating composition to the first clear coating when so required, and drying the coating, giving a transfer product (iv) having a second clear coating over the transfer product (iii).

Figure 1:
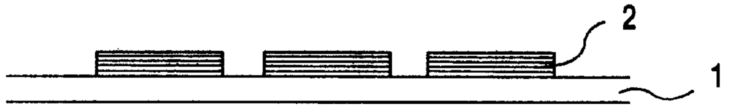
FIG. 1 is a section view of a copying sheet.
Figure 2:
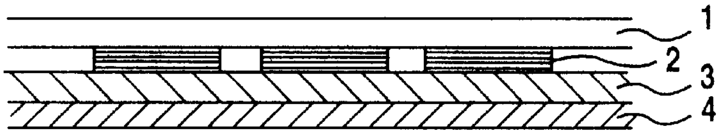
FIG. 2 is a section view of a transfer product (i).
Figure 3:
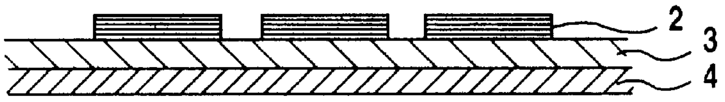
FIG. 3 is a section view of a transfer product (ii).
Figure 4:
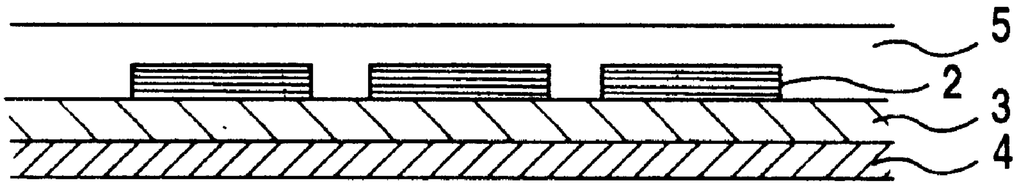
FIG. 4 is a section view of a transfer product (iii).
Figure 5:
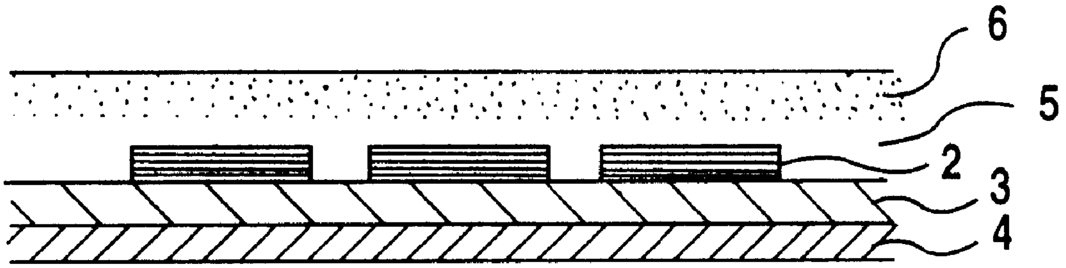
FIG. 5 is a section view of a transfer product (iv).

The method according to the preferred embodiment of the first invention is described below with reference to the drawings. FIG. 1 is a section view of a copying sheet which comprises a copy support 1 having a reproduced image layer 2 formed thereon. FIG. 2 is a section view of the transfer product (i) wherein the reproduced images have been heat-transferred after superposing the reproduced image layer of the copying sheet over a resin layer 3 for fixing the reproduced image formed on a cured coating 4. FIG. 3 is a section view of the transfer product (ii) wherein the copy support has been released from the transfer product (i) shown in FIG. 2. FIG. 4 is a section view of the transfer product (iii) wherein a first clear coating 5 has been formed on the transfer product (ii) shown in FIG. 3. FIG. 5 is a section view of the transfer product (iv) wherein a second clear coating 6 has been formed on the surface of the first clear coating of the transfer product (iii) when so required. The transfer product (iv) is the desirable image reproduction I according to the present invention.

As the cured coatings to be used in the present invention, conventional cured coatings can be used without specific limitation. Among them, cured coatings for automotive use are preferred. Automotive cured coatings include, for example, those comprising an undercoat, intercoat (which may be omitted) and topcoat as laminated on a metal substrate or plastics substrate.

Topcoats for use herein include, for example, solid color coats, finished coats of metallic luster, finished coats of pearlescent luster, etc. Stated more specifically, topcoats employable herein include those comprising a solid colored coat, metallic coat or pearlescent coat as a base coat and a clear coat as a topcoat which are formed by 2-coat 1-bake, 3-coat 1-bake, or 3-coat 2-bake coating method. The topcoats for use herein include those formed from a topcoat coating composition containing a curable resin component which comprises a base resin (such as acrylic resin, polyester resin, alkyd resin, epoxy resin, silicone resin, fluorine-containing resin or the like) and a crosslinking agent (such as amino resin, polyisocyanate compound, polycarboxylic acid compound or the like). The topcoat composition is used in the form known per se, for example, in the form of a solution or a dispersion comprising said base resin, crosslinking agent and the like dissolved or dispersed in an organic solvent or water.

The surface of cured coating for automotive use can be the surface of cured coating on any of new cars and used cars, or the surface of repaired coating.

The surface of cured coating may be ground, degreased or otherwise treated when required in conducting the method of the present invention.

According to the method of the present invention, preferably a resin coating composition for fixing the reproduced image is applied to the surface of cured coating, especially automotive cured coating. Said coating composition is used to facilitate the heat transfer of reproduced images, to fix the transferred reproduced image layer and to affix the transfer to the cured coating, for contributing to the formation of a durable transfer layer.

Isocyanate-curing acrylic resin coating compositions are suitable for use as the resin coating composition for fixing the reproduced image. More specific, desirable examples are isocyanate-curing acrylic resin coating compositions for a first or second coating to be described later and colored coating compositions containing a colored pigment as well as the acrylic resin composition. When the colored coating composition is used, a different color is formed in the background of the reproduced image layer, so that the reproduced images appear as if they were relieved or faded by the different color of the background.

The resin coating composition for fixing the reproduced image, such as an isocyanate-curing acrylic resin coating composition, is applied, for example, by spraying, brushing or like means. The thickness of the coating, although suitably selectable according to the required properties and appearance, is usually about 10 to about 200 $\mu$m, preferably about 20 to about 100 $\mu$m.

When the coating of the coating composition is dried for curing, the conditions for partial curing are so adjusted so as to provide the coating with the properties suited to heat transfer (heat softening properties). Stated more specifically, preferred conditions, although different depending on the type of the composition used and film thickness, are, for example, a film thickness of about 50 $\mu$m, and drying for about 6 to about 24 hours at 20° C. or heating for about 10 to 60 minutes at 60° C. If the coating composition is not fully cured and the coating remains sticky, it would become difficult to heat-transfer the images to such coating. Even if heat transfer is forcedly conducted in this case, the reproduced images of high clarity would not be formed. On the other hand, if the coating composition is fully cured to provide a completely cured coating, a coating incapable of heat-softening may be produced, resulting in a disadvantage that the adhesion is impaired between the coating and the reproduced image layer. Hence such curing is undesirable.

To determine whether the curing is complete or not, the softening properties at a heat transfer temperature are assessed. The curing extent can be determined by a simple method utilizing the solvent resistance. For example, if the luster of coating surface is reduced by scratching with xylol, the coating is partially crosslinked. If the luster is not altered at all, the coating is considered to have completely cured. The curing extent is also determined by a gel fraction ratio of coating. A suitable gel fraction ratio in the present invention is about 30 to about 80% by weight. The gel fraction ratio indicated herein was calculated by immersing an isolated coating in an acetone solvent, boiling the coating with refluxing for 8 hours, fully drying the same, and calculating the ratio by the equation (Weight of sample after extraction/weight of sample before extraction)×100.

According to a preferred embodiment of the present invention, the transfer product (i) is produced by heat transfer in the following manner. A copying sheet which comprises a copy support having reproduced images formed thereon is superposed on a cured coating to bring the reproduced images of the copying sheet into contact with the surface of the resin layer for fixing the reproduced image, whereby heat transfer is performed, giving a transfer product (i) having a cured coating, a resin layer for fixing the reproduced image, a reproduced image layer and a copy support as superposed in this order. FIG. 2 is a section view of the transfer product (i) obtained in this way.

The copying sheet comprises a copy support having reproduced images formed on the surface of the copy support. FIG. 1 is a section view of the copying sheet.

The copy support comprises a resin layer for forming reproduced images and, as necessary, a release layer such as release paper. When required, the surface of the resin layer and/or the surface of the release layer may be treated with silicone, wax or the like. The resin for forming the reproduced image is preferably a water-soluble resin which can be dissolved, for removal, in a release solution to be described later.

The copying sheet is prepared and used in the following manner. A pattern original is reproduced on a copy support of the copying sheet using a copying machine to form a reproduced image layer on the surface of a resin layer for forming reproduced images. The reproduced images are heat-transferred to the surface of the resin layer for fixing the reproduced image on the cured coating to form reproduced images thereon. The type of the copying machine is not specifically limited in the invention and can be any of conventional single-color and multi-color copying machines. However, preferred is an electron photographic type machine capable of statically fixing the toner particles. The pattern original, which is reversely reproduced by heat transfer, is preferably duplicated from the reverse surface of the pattern original by transfer.

The copying sheet can be prevented from creasing by heating its surface with a drier or the like to remove the moisture from the sheet.

The heat transfer can be conducted using a dryer for industrial use or for household use at a sheet temperature of about 30 to about 70° C., preferably about 30 to about 60° C. for about 30 to about 120 seconds (in the case of A4 size) while pressing the copying sheet against the cured coating. When required, the surface of the transfer may be lightly rubbed with a fabric piece to smooth out the crumpled film by removing the air from between the resin layer for fixing the reproduced image (hereinafter referred to as "image-fixing layer") on the cured coating and the reproduced image layer while the reproduced image layer is warm, so that the reproduced image layer can be uniformly affixed to the surface of the image-fixing layer.

After transfer, the copy support is released or removed from the reproduced image layer. The release can be done directly or with a release solution. A preferred release solution comprises water as a main component and optionally a detergent and a water-soluble organic solvent such as methanol, ethanol, isopropyl alcohol or the like. When a detergent is used, the surface of the reproduced image layer should be washed with water before application of a clear coating composition to fully eliminate the detergent.

When the release solution is used, the reproduced image product is drained for drying, for example, by standing at room temperature for at least 30 minutes.

After transfer, it does not matter whether the image-fixing layer has partially cured or completely cured. The image-fixing layer which has partially cured must be completely cured at last. Such layer can be conveniently cured at the same time as the curing of the first clear coating or the second clear coating.

The transfer product (ii) prepared by said method comprises a cured coating 4, an image-fixing layer 3 and a reproduced image layer 2 as laminated in this order as shown in FIG. 3.

According to the method of the present invention, an isocyanate-curing cellulose acetate butyrate-modified acrylic resin clear coating composition is applied to the surface of the reproduced image layer of the transfer product (ii) and dried to give a first clear coating. Such specific clear coating composition can be prevented from cratering.

The isocyanate-curing cellulose acetate butyrate-modified acrylic resin clear coating composition for forming the first clear coating comprises cellulose acetate butyrate (hereinafter referred to as "CAB")-modified acrylic resin as a base resin and a polyisocyanate compound as a curing agent.

The CAB-modified acrylic resin is produced by radical polymerization reaction of a mixture of CAB, hydroxyl-containing acrylic monomer and, when necessary, other radically polymerizable monomer.

The CAB which can be used herein is a cellulose derivative prepared by butyl-esterifying partially acetylated cellulose. A preferred CAB has an acetyl group content of about 1 to about 30% by weight, preferably about 1 to about 14% by weight and a butyl group content of about 16 to about 60% by weight, preferably about 35 to about 60% by weight. Suitable examples of commercially available products include, for example, "EAB-381" (trademark, product of Eastman-Kodak Co.), "EAB-551" (trademark, product of Eastman-Kodak Co.), etc.

Examples of the hydroxyl-containing acrylic monomer are compounds having one hydroxyl group, and one (meth) acryloyl group, per molecule such as hydroxyethyl (meth) acrylate, hydroxypropyl (meth)acrylate, hydroxybutyl (meth)acrylate, ethylene glycol mono(meth)acrylate, propylene glycol mono(meth)acrylate, and hydroxyl-containing acrylic monomers prepared by modifying these monomers with ε-caprolactone.

Examples of the other radically polymerizable monomer include compounds having a radically polymerizable, α,β-ethylenically unsaturated bond per molecule, such as styrene, its derivatives, methyl (meth)acrylate, ethyl (meth) acrylate, butyl (meth)acrylate, 2-ethylhexyl (meth)acrylate, lauryl (meth)acrylate, and like alkyl esters of (meth)acrylic acids, (meth)acrylic acids, (meth)acrylonitrile, etc.

In the copolymerization for preparing the CAB-modified acrylic resin, the monomers are used in the following proportions: based on the total amount of the monomers used, about 10 to about 30% by weight, preferably about 15 to about 25% by weight, of the CAB; about 1 to about 50% by weight, preferably about 5 to about 35% by weight, of the hydroxyl-containing acrylic monomer; and about 20 to about 89% by weight, preferably about 40 to about 80% by weight, of the other radically polymerizable monomer. If the proportion of the CAB is below 10% by weight, the coating composition for a second clear coating which is applied in the subsequent step when required is likely to cause cratering, and hence this proportion is undesirable. On the other hand, the proportion of above 30% by weight reduces the surface smoothness of the second clear coating, and hence is undesirable. The hydroxyl-containing acrylic monomer used in a proportion of below about 1% by weight lowers the curability of the composition, and impairs the water resistance, weatherability and processability and like coating properties. Hence said proportion is undesirable. If the proportion is above about 50% by weight, hydroxyl groups which can not be cured with a polyisocyanate curing agent would remain in an increased amount, resulting in the decrease of water resistance, weatherability and like coating properties. Hence said proportion is undesirable.

Suitably the CAB-modified acrylic resin has a weight average molecular weight of about 5,000 to about 200,000, preferably about 8,000 to about 100,000. The weight average molecular weight of less than about 5,000 reduces the water resistance, weatherability, processability and other coating properties and deteriorates the finished appearance of the second clear coating (cratering, etc.), and hence is undesirable. On the other hand, the weight average molecular weight of more than about 200,000 lowers the surface smoothness of the second clear coating, and hence is undesirable.

Preferred polyisocyanate compounds are those free of yellowing. Examples of such compounds are aliphatic diisocyanate compounds such as trimethylene diisocyanate, hexamethylene diisocyanate, etc., alicyclic diisocyanate compounds such as isophorone diisocyanate, etc., biuret-type addition reaction products of these polyisocyanate compounds or isocyanurate ring type addition reaction products thereof, polyol-modified compounds thereof, and so on.

The proportions of the CAB-modified acrylic resin and the polyisocyanate compound are about 0.8–1.5 in terms of NCO/OH equivalent ratio.

When required, the coating composition for the first clear coating may contain an organic solvent, rheology control agent, ultraviolet stabilizer, ultraviolet absorber and like additives.

It is desirable that the coating composition for the first clear coating have a surface tension of up to 30 dyne/cm. A higher surface tension tends to bring about cratering of the composition and hence is undesirable. The surface tension can be adjusted, for example, with a silicone type additive.

The coating composition for the first clear coating can be applied by spraying, brushing or like means. The thickness of the first clear coating can be properly selected according to the required properties and appearance. Usually the thickness of cured coating is in the range of about 10 about 200 $\mu$m, preferably about 20 to about 100 $\mu$m. The composition is dried for curing to an extent avoiding the possibility that the coating composition for the second clear coating will be dissolved in or mixed with the first clear coating, thereby impairing the finished appearance. Such drying conditions, although variable depending on the type and proportion of the composition, are sufficient if the coating is dried, for example, for about 6 to about 48 hours at about 20° C. or heated for about 10 minutes to about 2 hours at about 60° C.

The transfer product (iii) having the first clear coating comprises a cured coating 4, an image-fixing layer 3, a reproduced image layer 2 and a first clear coating 5 as laminated in this order as shown in FIG. 4. The transfer product (iii) is included in the image reproduction I according to the present invention.

In a preferred embodiment of the invention, optionally a second clear coating may be formed by applying a clear coating composition to the surface of the first clear coating of the transfer product (iii), followed by drying. Thereby the finished appearance of the transfer product is further improved.

The clear coating composition for forming the second clear coating can be selected without limitation from conventional non-crosslinking solvent-vaporizable coating compositions, room temperature-crosslinking coating compositions, heat-crosslinking coating compositions and activation energy radiation crosslinking coating compositions. The coating composition to be used herein are not specifically limited. Typical examples are as described below.

The non-crosslinking solvent-vaporizable coating compositions are capable of forming a dried coating merely by the vaporization of a solvent. Examples of such compositions are those containing, as a main component, a cellulose derivative which is soluble in a solvent, such as nitrocellulose, acetylcellulose, benzylcellulose or the like.

The room temperature-crosslinking coating compositions are curable by crosslinking at room temperature, and include, for example, coating compositions containing a room temperature-curable resin as a main component. Examples of such resins are oxidation-polymerizable resins such as oxidation-polymerizable unsaturated group-containing unsaturated fatty acids, oxidation-polymerizable unsaturated group-containing alkyd resins, etc.; moisture-curing resins such as isocyanate group-containing acrylic resins, alkoxysilyl group-containing acrylic resins, alkoxysilyl group-containing silicon-modified polyester resins, etc.; curable resins comprising a hydroxyl-containing resin such as polyether polyol, polyester polyol, acryl polyol or the like, and a polyisocyanate curing agent; radical reaction-curable resins comprising an unsaturated polyester resin and a peroxide; and mixtures of these resins. Heat-crosslinking coating compositions are curable on crosslinking by heating preferably at about 140° C. or lower, and include those comprising a heat-curable resin or the like as a main component. Examples of the resin as the main component are self-curing resins such as N-methylol group-containing acrylic resins, etc.; curable resins such as those comprising polyether polyol, polyester polyol, acryl polyol or like hydroxyl-containing resins and a curing agent such as amino resin, blocked polyisocyanate or the like, those comprising acrylic resin, polyester resin or like polycarboxylic acid resins and a polyepoxide crosslinking agent; and mixtures of these resins, etc. Activation energy radiation crosslinking coating compositions are those which are curable on crosslinking by irradiation with activation energy radiation. Examples of such compositions are those comprising, as a main component, an activation energy radiation curable unsaturated group-containing acrylic resin, polyester resin, silicone resin, polyether resin, or a mixture of these resins. Where necessary, these coating compositions may contain cratering inhibitors, surface control agents, UV absorbers, UV stabilizers, curing catalysts, transparent pigments, transparent fillers, etc. and also may contain a coloring agent in an amount which does not hide the reproduced image layer, such as colored pigments, metal flakes and colored mica, etc.

The clear coating composition for use in the invention can be any of organic solvent solution compositions, organic solvent dispersion compositions, aqueous solution compositions, aqueous dispersion compositions, powder compositions, etc.

Among these clear coating compositions, it is suitable to use an isocyanate-curing acrylic resin clear coating composition comprising a hydroxyl-containing acrylic resin as a base resin and a polyisocyanate compound as a curing agent, the composition being excellent in finished appearance, low-temperature curability, weatherability, etc.

Hydroxyl-containing acrylic resins are those prepared by radical polymerization of a mixture of hydroxyl-containing acrylic monomer and, as necessary, other radically polymerizable monomer.

Examples of useful hydroxyl-containing acrylic monomers and other radically polymerizable monomers optionally used include those exemplified above.

In the copolymerization for preparing the hydroxyl-containing acrylic resin, the monomers are used in the following proportions: based on the total amount of the monomers used, about 1 to about 50% by weight, preferably about 5 to about 35% by weight, of the hydroxyl-containing acrylic monomer; and about 50 to about 99% by weight, preferably about 65 to about 95% by weight, of the other radically polymerizable monomer. If the proportion of the hydroxyl-containing acrylic monomer is about 1% or less by weight, the coating composition is reduced in curability and impaired in water resistance, weatherability, processability and like coating properties. Hence said proportion is undesirable. On the other hand, if the proportion is above about 50% by weight, hydroxyl groups which can not be cured with a polyisocyanate curing agent would remain in an increased amount, resulting in the decrease of water resistance, weatherability and other coating properties. Hence said proportion is undesirable.

The hydroxyl-containing acrylic resin has suitably a weight average molecular weight of about 6,000 to 100,000, preferably about 8,000 to 80,000. The weight average molecular weight of less than about 6,000 reduces the water resistance, weatherability, processability and other coating properties and hence is undesirable. On the other hand, the weight average molecular weight of more than about 100, 000 lowers the surface smoothness of the coating, and hence is undesirable.

Useful polyisocyanate compounds include those exemplified above.

The proportions of the hydroxyl-containing acrylic resin and polyisocyanate compound are about 0.8–1.5 in terms of NCO/OH equivalent ratio.

The coating composition for the second clear coating is applied, for example, by spraying, brushing or like means. The thickness of the coating, although suitably selectable according to the required properties and appearance, is usually about 10 to about 200 μm, preferably about 20 to about 100 μm. The drying conditions are variously selected depending on the type and proportion of the composition. Usually the drying is conducted for about 6 to about 48 hours at about 20° C. or for about 10 minutes to about 2 hours at about 60° C.

The transfer product (iv) having the second clear coating comprises a cured coating 4, an image-fixing layer 3, a reproduced image layer 2, a first clear coating 5 and a second clear coating 6 laminated in this order as shown in FIG. 5.

According to the first invention, the specific coating composition is used for the first clear coating, whereby the adhesion of the reproduced image layer is improved and the cratering of clear coating is prevented, and therefore the reproduced image layer which is excellent in finished appearance, aesthetic property and durability is formed on the cured coating, especially an automotive cured coating.

The second invention is described below in more detail.

According to the second invention, there are provided an image reproduction II comprising a cured coating having a surface treated with an organic solvent of about 7.5 to about 8.2 in solubility parameter, a reproduced image layer and a clear coating as laminated in this order, and a method of forming reproduced images on the surface of cured coating, the method comprising the steps of treating a surface of the cured coating with an organic solvent of about 7.5 to about 8.2 in solubility parameter, superposing, over a cured coating, a copying sheet comprising a copy support having a reproduced image layer thereon to bring the reproduced images of the copying sheet into contact with the organic solvent-treated surface of cured coating, heat-transferring the reproduced images to the surface of cured coating, releasing the copy support to give a transfer product having a reproduced image layer on the cured coating, and applying a clear coating to the surface of the transfer product.

Stated more specifically, the method of the second invention is carried out as follows.

(1) The surface of cured coating is treated with said specific organic solvent, and heat transfer is carried out using a copying sheet comprising a copy support having images reproduced thereon after superposing the surface of reproduced image layer of the copying sheet on the surface of cured coating treated with the organic solvent, giving a transfer product (v) comprising a cured coating having a surface treated with the organic solvent, a reproduced image layer and a copy support as superposed in this order.

(2) The copy support is released from the transfer product (v), giving a transfer product (vi) comprising a cured coating having a surface treated with the organic solvent, and a reproduced image layer as superposed in this order.

(3) A clear coating composition is applied to the surface of the transfer product (vi) and dried, giving a transfer product (vii) having a clear coating formed on the transfer product (vi).

Figure 6:
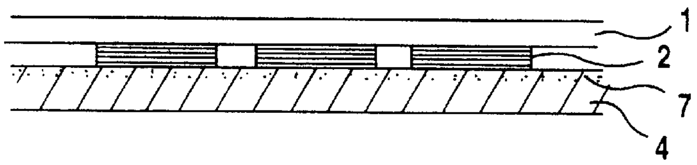
FIG. 6 is a section view of a transfer product (v).
Figure 7:
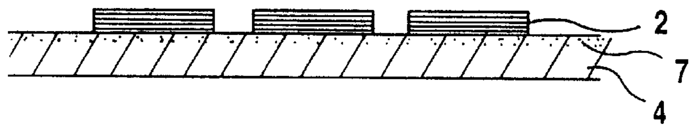
FIG. 7 is a section view of a transfer product (vi).
Figure 8:
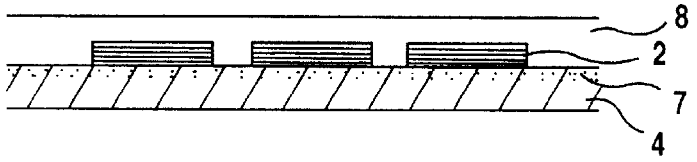
FIG. 8 is a section view of a transfer product (vii).

The second invention is described below with reference to the drawings. FIG. 1 is a section view of a copying sheet which comprises a copy support 1 having a reproduced image layer 2 formed thereon. FIG. 6 is a section view of the transfer product (v) prepared by heat transfer in such a manner that the reproduced image layer of the copying sheet is superposed on a surface 7 of the cured coating 4 treated with the organic solvent. FIG. 7 is a section view of a transfer product (vi) formed by releasing the copy support from the transfer product (v) shown in FIG. 6. FIG. 8 is a section view of a transfer product (vii) having a clear coating 8 formed on the transfer product (vi) shown in FIG. 7. The transfer product (vii) is the image reproduction II according to the present invention.

The cured coating to be used in the method of the second invention includes conventional cured coatings which can be used without specific limitation as is the case with the first invention. Among them, cured coatings formed for automotive use are preferably used.

The cured coatings for automotive use which are used in the second invention can be the same as those used in the first invention in the structure, the type of coating composition used, etc. The coating applied as a topcoat is preferably heated for curing to an extent avoiding the possibility that the cured coating may become softened due to the swelling and dissolution of cured coating caused by the organic solvent during the treatment and consequently may become deformed during heat transfer, reducing the clarity of reproduced images. The heating conditions may be properly selected depending on the type of the coating composition. For example, the coating is heated preferably at about 120 to about 180° C. for about 20 to about 60 minutes when an amino resin or polycarboxylic acid compound is used as a curing agent.

Before treatment with the organic solvent in the method of the second invention, the resin coating composition for fixing the reproduced image as used in the first invention may be applied to form an undercoat on a surface portion for forming a reproduced image layer. In this case, the undercoat may be partially cured by heating or at room temperature. The undercoat thus formed gives an advantage that the adhesion between the cured coating and the reproduced image layer is stabilized without being affected by the type and age of cured coating.

Preferably the cured coating or a coating formed on the cured coating from the resin coating composition for fixing the reproduced image (which may be hereinafter collectively referred to as "cured coating") is subjected to sanding with water-resistant paper or the like before treatment with the organic solvent.

The organic solvent to be used for treating the surface of the cured coating is one incapable of dissolving the cured coating and having a low solvent power for dissolving the reproduced image layer of the copying sheet.

In other words, if the organic solvent is capable of dissolving the cured coating, the cured coating when swollen or dissolved would become softened so that the cured coating would become deformed by heat transfer, resulting in failure to give a reproduced image layer with great clarity. If the organic solvent has too high a solvent power for dissolving the reproduced image layer of the copying sheet, the reproduced image is deformed by the pressure involved during heat transfer, and defects such as shrinks are caused in the reproduced image layer, leading to the reduced commercial value of the transfer product. Yet, if the organic solvent is entirely incapable of dissolving the reproduced image layer, the adhesion of the reproduced image layer to the cured coating is lowered.

The organic solvent is variable in the solvent power for dissolving the cured coating and the reproduced image layer depending on the type or age (passage of time) of cured coating, the resin component of the printing ink used for forming a reproduced image layer, and other factors. Therefore, the organic solvent which is suitable for the specific conditions is properly selected for use.

It is critical in the present invention to use the organic solvent with the foregoing properties which has a solubility parameter of about 7.5 to about 8.2. The solubility parameter referred to herein is calculated by (cohesive energy density/molar volume)$^{1/2}$. If the solubility parameter is less than about 7.5, the adhesion between the cured coating and the reproduced image layer is likely to decrease due to its low solvent power for dissolving the reproduced image layer. Hence such solvent is undesirable to use. On the other hand, if a solubility parameter is more than about 8.2, there arise, due to its high solvent power for dissolving the reproduced image layer, deformation and shrinks of reproduced image layer, and cratering of clear coating caused by the inability to control the action of silicone on the surface of reproduced image layer and cured coating owing to a low permeability into the cured coating and the reproduced image layer. Hence the solvent with such parameter is undesirable to use.

The above-mentioned solubility parameter of the organic solvent applies to a mixture of 2 or more solvents. The solubility parameter of a mixture of at least two solvents can be calculated by the following equation:

$S_1 \times \Phi_1 + S_2$ . . . (wherein $S_1$, $S_2$ . . . mean the solubility parameter of each solvent of the mixture, and $\Phi_1$, $\Phi_2$ . . . mean the volume fraction of each solvent of the mixture.

A small quantity of the organic solvent used for treating the cured coating preferably remains on the surface of the coating until superposition of the copying sheet on the cured coating. If a large quantity of the organic solvent used for treatment is left on the surface of cured coating in heat transfer, foaming would be caused by heat transfer and the durability of the reproduced image layer would be lowered. If the organic solvent has completely dried up, it becomes impossible to control the action of silicone on the surface of reproduced image layer and cured coating, causing cratering to occur on the clear coating and reducing the adhesion of the clear coating. Hence the complete absence of the solvent is undesirable.

The amount of the organic solvent which should remain on the surface of cured coating depends largely on the boiling point of the organic solvent. The boiling point of the solvent is about 60 to about 250° C., preferably about 100 to about 230° C. when the organic solvent is used singly. If a mixture of organic solvents is used, preferably the solvent having said boiling point accounts for at least about 50% by weight, or preferably about 60% by weight, of the mixture.

If the organic solvent has a boiling point of lower than about 60° C., the solvent would remain on the surface of coating for a shorter period, and only a short time could be left for heat transfer. If the organic solvent has a boiling point of over about 250° C., the solvent is apt to remain between the cured coating and the reproduced image layer or in the reproduced image layer, resulting in the decrease of adhesion and durability. Hence the solvent is undesirable to use.

Examples of preferred organic solvents are heptane, mineral spirit, ethylcyclohexane, kerosene, turpentine oil, dipentene, "Shellzol D70" (trademark, product of Shell Chemical Co., Ltd.), "Exxon Naphtha No. 3" (trademark, product of Exxon Chemical Co., Ltd.), "IP Solvent 1016" (trademark, product of Idemitsu Petrochemical Co., Ltd.), etc.

In the treatment with the organic solvent in the method of the invention, the organic solvent used therein does not dissolve the cured coating, but slightly dissolves the reproduced image layer and has a specific solubility parameter. Such organic solvent is applied to the cured coating so that some portion of the solvent would remain.

A surface of the cured coating is treated with the organic solvent, for example, by being coated with the organic solvent using a spray coater, roll coater or the like or by being rubbed with a fabric, sponge or cotton piece soaked with the organic solvent.

The organic solvent is used for the treatment in an amount of about 20 to about 150 g, preferably about 30 to about 100 g, per square meter of cured coating.

The silicone (which has been affixed to a copy support in forming reproduced images on the copy support using a copying machine) is deposited on the cured coating and on the reproduced image layer during heat transfer. Then the silicone is dissolved in or diluted with the organic solvent remaining after treatment. Further the silicone thus dissolved or diluted is caused to become permeated or dispersed on the cured coating and the reproduced image layer formed thereon, whereby presumably the action of the silicone is controlled, resulting in markedly improved adhesion of reproduced image layer to the cured coating, and in avoided cratering of a clear coating composition to be subsequently applied.

The reproduced image layer of the copying sheet is superposed on the surface of cured coating treated in this way with the organic solvent to accomplish heat transfer while the organic solvent remains. FIG. 6 is a section view of the transfer product (v) thus obtained.

As described hereinbefore, the copying sheet has a copy support with a reproduced image layer formed thereon as shown in FIG. 1.

The surface of the copying sheet may be heated by a drier or the like before heat transfer to remove the moisture from the sheet so that the sheet can be prevented from shrinking.

The heat transfer can be carried out using a dryer for industrial use or for household use at a sheet temperature of about 30 to about 100° C., preferably about 30 to about 70° C. for about 30 to about 120 seconds (in the case of A4 size) while pressing the copying sheet against the cured coating. A sheet temperature lower than about 30° C. reduces the adhesion between the cured coating and the reproduced image layer, whereas a sheet temperature of higher than 100° C. allows the organic solvent to readily dissolve the reproduced image layer, thereby bringing about the shrinks on the reproduced image layer or lowering the clarity of the reproduced image layer. Hence the sheet temperature outside said range is undesirable. When required, the surface of the transfer may be lightly rubbed with a fabric piece to smooth out the crumpled film by removing the air from between the cured coating and the reproduced image layer while the reproduced image layer is warm, so that the reproduced image layer is uniformly attached to the surface of the cured coating.

The copy support is released or removed from the reproduced image layer after transfer. The release can be done in the same manner as in the first invention. The obtained transfer product (vi) comprises a cured coating 4 having a surface 7 treated with the organic solvent, and a reproduced image layer 2 laminated in this order as shown in FIG. 7.

Thereafter, a clear coating composition is applied to the surface of the above-obtained transfer product and dried to give a clear coating. It is not important whether the organic solvent has been remaining or not during the application of the clear coating composition. The clear coating composition useful in the second invention can be used as selected without limitation from conventional non-crosslinking or crosslinking coating compositions, and can be any of coating compositions for the first clear coating and for the second clear coating in the first invention. Preferred clear coating compositions are isocyanate-curing acrylic resin clear coating compositions comprising a hydroxyl-containing acrylic resin as a base resin and a polyisocyanate compound as a curing agent, as is the case with the clear coating compositions for the second clear coating in the first invention. The clear coating composition can be applied and dried in the same manner as the clear coating compositions for the first and second clear coatings in the first invention.

The transfer product (vii) prepared according to the second invention comprises a cured coating 4 having a surface 7 treated with an organic solvent, a reproduced image layer 2, and a clear coating 8 laminated in this order as shown in FIG. 8. The cured coating may include a cured image-fixing layer, when so required.

According to the method of the second invention, the reproduced image layer which is excellent in finished appearance, aesthetic property and durability (e.g. water resistance) is formed on the cured coating, especially automotive cured coating.

Such remarkable effects can be produced by the method of the second invention for the following reasons. The silicone adhering to the cured coating and to the reproduced image layer formed thereon (the silicone attached to the copy support in forming a reproduced image layer on the copy support of a copying sheet using a copying machine is deposited, during heat transfer, on the cured coating and the reproduced image layer) is dissolved in or diluted with the organic solvent remaining after treatment with the solvent and is permeated and dispersed in the cured coating and the reproduced image layer formed thereon, with the result that presumably the action of silicone is controlled, and therefore the adhesion of the reproduced image layer is markedly improved and a clear coating composition to be subsequently applied is prevented from cratering.

The present invention is described below in more detail with reference to the following examples and comparative examples.

Examples and Comparative Example for the First Invention

EXAMPLE 1

A copying sheet was produced by reversely reproducing images from a pattern as the original drawing on a copy support using "Color Laser Copier Piccel 700" (trademark, product of Canon Inc., toner type) as a color copying machine. The copy support is a sheet commercially available under "Copress 4H" (trademark, product of Osaka Taiyo Bussan Co., Ltd.) which comprises a resin layer for forming reproduced images (hereinafter called "image-forming resin layer") and release paper.

"Retan PG-60 White Enamel" (trademark, product of Kansai Paint Co., Ltd., acryl-urethane coating composition) was applied by spraying to the surface of a coated automotive exterior panel (panel coated with white coating film of melamine-curing acrylic resin coating composition) to a thickness of 60 $\mu$m when cured and was heated at 60° C. for 20 minutes to give a white image-fixing layer of isocyanate-curing acrylic resin. The curing extent of the coating thus obtained was amassed by the following method, and the coating was found to have partially cured.

The surface of the coating was reciprocally rubbed by 10 strokes using three superposed pieces of gauze as impregnated with xylol. Thereafter, the coating was checked for the dissolution of the coating and the change of luster. The coating without any change in luster was assessed as having completely cured, whereas the coating with impaired luster was assessed as having partially cured.

The copying sheet was superposed on the coating to bring the surface of the reproduced image layer of the copying sheet into contact with the surface of the coating. After the release paper was removed from the copying sheet, the image-forming resin layer was heated with a drier to a film temperature of 40 to 50° C. The surface of the copying sheet was lightly rubbed with paper to press the reproduced image layer against the isocyanate-curing acrylic resin layer on the automotive cured coating while eliminating bubbles from between them, giving a transfer product (i).

The obtained transfer product (i) was left to stand at room temperature for 30 minutes for cooling. Water was sprinkled over the surface of the image-forming resin layer of the transfer product (i). Then, the image-forming resin layer was removed by rubbing with fingers, followed by washing with a neutral detergent and water, and drain-drying, giving a transfer product (ii) comprising an automotive cured coating, an isocyanate-curing acrylic resin layer and a reproduced image layer as laminated in this order.

Diluted with a solvent (cellosolve acetate/butyl acetate=70/30 weight ratio) was a composition comprising 70 parts by weight (calculated as solids) of a CAB-modified acrylic resin [with a monomer composition of "EAB-551-0.2" (trademark, product of Eastman-Kodak Co., CAB, acetyl group content 2% by weight, butyl group content 53% by weight)/2-hydroxyethyl methacrylate/styrene/methyl methacrylate/ethyl acrylate=20/10/16/16/38 (weight ratio), weight average molecular weight about 20,000], and 30 parts by weight (calculated as solids) of hexamethylene diisocyanate. "BYK-306" (trademark, product of BYK Co., silicone-type additive) was added to the diluted composition to adjust the surface tension to 27 dynes/cm to provide a clear coating composition. The clear composition thus obtained was applied by spraying to the surface of the reproduced image layer of the transfer product (ii) to a thickness of about 60 μm (when cured) and was baked at 60° C. for 10 minutes to form a first clear coating on the surface of the reproduced image layer, whereby a transfer product (iii) was produced.

"Retan PG 60 Clear" (trademark, product of Kansai Paint Co., Ltd., acryl-urethane coating composition) was applied by spraying to the surface of the first clear coating of the transfer product (iii) and was heated at 60° C. for 30 minutes to form a second clear coating, whereby a transfer product (iv) was produced.

The obtained transfer product (iv) measured 1 m×1 m and had two or less craters, namely was excellent in finished appearance. The surface of the coating had a specular reflectance of 90% (incidence angle and light-receiving angle, both 60°), and the reproduced image layer was remarkable in clarity and thus the transfer product (iv) was excellent in aesthetic property. The transfer product (iv) was checked for water resistance by the following method. The product was rated as A in appearance and as A in adhesion and was good in durability.

The water resistance was determined by immersing a test piece in tap water at 40° C. for 240 hours and rating the appearance and adhesion after drying. The appearance was rated according to the following criteria: A, no blister; B, a few blisters; C, several blisters; and D, blisters abounding. The adhesion was evaluated by the following method. The surface of the transfer product was cut by a sharp cutter to the automotive cured coating to form 100 squares, 2 mm×2 mm. Then, cellophane tape was applied over the cut and was removed. The adhesion was assessed in terms of peeling extent as follows: A, no peeling; B, slightly peeled along the cut or the coating remaining on at least 98% of the adhering area; C, the coating remaining on 80 to 98% of the adhering area; and D, the coating remaining on up to 80% of the adhering area.

EXAMPLE 2

The same procedure as in Example 1 was repeated with the exception of using "Retan PG-60 Clear" (trademark, the same as above) in place of "Retan PG-60 White Enamel", giving a transfer product (iv). The transfer product (iv) measured 1 m×1 m, and had two craters or less, and the surface of the coating had a specular reflectance of 91%. Thus the product (iv) was excellent in finished appearance and in aesthetic property. The water resistance of the transfer product (iv) was rated as A in appearance and as A in adhesion. The product was good in durability.

Comparative Example 1

A comparative transfer product (iv) was produced by repeating the procedure of Example 1 with the exception of using "Retan PG-60 Clear" (the same as above) in place of the composition comprising a CAB-modified acrylic resin and hexamethylene diisocyanate applied to the surface of the reproduced image layer of the transfer product (ii). The transfer product (iv) thus obtained, measuring 1 m×1 m, had 100 or more craters, and was hence poor in finished appearance. The surface of the coating had a specular reflectance of 75%. As to the water resistance, the transfer product (iv) was rated as C in appearance and as C in adhesion and was low in durability.

Examples and Comparative Examples for the Second Invention

EXAMPLE 3

A copying sheet was produced by reversely reproducing images from a pattern as the original drawing on a copy support using "Color Laser Copier Piccel 700" (trademark, product of Canon Inc., toner type) as a color copying machine. The copy support was one available under "Copress 4H" (trademark, product of Osaka Taiyo Bussan Co., Ltd.) and had an image-forming resin layer and release paper (A4 size).

A surface portion of coated automotive exterior panel (exterior panel coated with white cured coating of melamine-curing acrylic resin coating composition, baked at 140° C. for 30 minutes, 60 cm×60 cm) to be used for heat transfer was subjected to wet sanding with water resistant paper #1000, and dried. The dried coating was sprayed with about 30 to about 40 g/m$^2$ of mineral spirit (solubility parameter 8.1, boiling point 150 to 205° C.) for treatment with the organic solvent.

The reproduced image layer of the copying sheet was superposed on the surface of cured coating treated with the organic solvent in contact with each other. Then, release paper was removed from the copying sheet. The copying sheet was heated from the side of image-forming resin layer with a drier to a film temperature of 40 to 50° C. The surface of the copying sheet was lightly rubbed with paper to press the reproduced image layer against the cured coating while eliminating the organic solvent and bubbles from between them, giving a transfer product comprising an automotive cured coating, a reproduced image layer and an image-forming resin layer as laminated in this order.

The obtained transfer product was left to stand at room temperature for 30 minutes for cooling. Water was sprinkled over the surface of the image-forming resin layer of the transfer product. Then, the image-forming resin layer was removed by rubbing with fingers. The transfer product was washed with a neutral detergent and with water, and dried by draining, giving a transfer product (vi) comprising an automotive cured coating having a surface treated with an organic solvent, and a reproduced image layer as laminated in this order.

Diluted with a solvent was a clear composition comprising 70 parts by weight (calculated as solids) of an acrylic resin [with a monomer composition of 2-hydroxyethyl methacrylate/styrene/methyl methacrylate/ethyl acrylate=20/16/26/38 (weight ratio), weight average molecular weight about 20,000], and 30 parts by weight (calculated as solids) of hexamethylene diisocyanate. Added to the diluted composition was 0.1 parts by weight of "BYK-306" (trademark, product of BYK Co., silicone-type additive), giving a clear coating composition of isocyanate-curing acrylic resin. The clear composition thus obtained was applied by spraying to the surface of the transfer product (vi) to a thickness of about 60 μm (when cured), set for about 20 minutes and baked at 60° C. for 60 minutes, giving a transfer product (vii) comprising an automotive cured coating with a surface treated with an organic solvent, a reproduced image layer and a cured clear coating as laminated in this order.

EXAMPLE 4

The procedure of Example 3 was repeated with the exception of spraying the coated automotive exterior panel (exterior panel coated with white coating film of melamine-curing acrylic resin coating composition) used in Example 3 with the isocyanate-curing acrylic resin clear coating composition used in Example 3 to a thickness of about 60 μm when cured, setting the coated panel for about 20 minutes, and baking the same at 60° C. for 30 minutes to form an image-fixing layer, whereby a transfer product (vii) comprising an automotive cured coating (including a cured clear coating) having a surface treated with an organic solvent, a reproduced image layer and a cured clear coating as laminated in this order.

Examples 5 to 11

The procedure of Example 4 was repeated with the exception of using the organic solvents shown below in Table 1, thereby producing a transfer product (vii) comprising an automotive cured coating (including a cured clear coating) having a surface treated with an organic solvent, a reproduced image layer and a cured clear coating as laminated in this order.

Comparative Example 2

The procedure of Example 3 was repeated with the exception of not using the organic solvent, producing a transfer product comprising an automotive cured coating, a reproduced image layer and a cured clear coating as laminated in this order.

Comparative Example 3

The procedure of Example 4 was repeated with the exception of not using the organic solvent, producing a transfer product comprising an automotive cured coating (including a cured clear coating), a reproduced image layer and a cured clear coating as laminated in this order.

Comparative Examples 4 to 6

The procedure of Example 4 was repeated with the exception of using the organic solvents shown in Table 1, thereby producing a transfer product comprising an automotive cured coating (including a cured clear coating) with a surface treated with an organic solvent, a reproduced image layer and a cured clear coating as laminated in this order.

The transfer products prepared in Examples 3 to 11 and Comparative Examples 2 to 6 were evaluated in properties by the following test methods.

Condition of Transfer

The surface of the reproduced image layer was checked as to the transfer products prepared by removing the image-forming resin layer and drying by draining for 4 hours in Examples and Comparative Examples, namely the transfer products comprising an automotive cured coating (including a cured clear coating) and a reproduced image layer. The surface of the reproduced image layer was assessed as follows: A, free of shrinks and popping and acceptable; B, some shrinks but no problem posed when used; C, suffering shrinks and unacceptable; and D, suffering both shrinks and popping and unacceptable.

Adhesion of reproduced Image Layer

The adhesion test was carried out on the transfer products prepared by the same method as stated above in the test for the condition of transfer. The transfer product was cut with a sharp cutter to the automotive cured coating to produce 100 squares, 2 mm×2 mm. Then, cellophane tape was applied over the surface of squares and removed. The peeling extent was amassed as follows: A, no peeling; B, slightly peeled along the cut or the coating remaining on at least 98% of the adhering area; C, the coating remaining on 80 to about 98% of the adhering area; and D, the coating remaining on less than 80% of the adhering area.

Finished Appearance

The appearance of the transfer product finally obtained was visually evaluated as to craters, etc. as follows: A, good in appearance; B, slightly poor in appearance, and no problem posed in use; C, impaired in appearance; and D, pronouncedly impaired in appearance.

Water Resistance

The transfer product finally obtained was immersed in tap water at 40° C. for 240 hours, dried and checked for appearance and adhesion. The appearance was evaluated as follows: A, no blister; B, a few blisters; C some blisters, and D, blisters abounding. The adhesion was evaluated by cutting the surface of the clear coating to the automotive cured coating and subsequently following the same procedure as done in the test for the adhesion of reproduced image layer.

The results are shown in Table 1.

TABLE 1

| Organic solvent | Example | | | | | | | | |
|---|---|---|---|---|---|---|---|---|---|
| (wt ratio) | 3 | 4 | 5 | 6 | 7 | 8 | 9 | 10 | 11 |
| Mineral spirit | 100 | 100 | | | 50 | | 50 | | 90 |
| Exxon Naphtha No. 3 | | | 100 | | 50 | 50 | | 80 | |
| Ethylcyclohexane | | | | 100 | | 50 | 50 | | |
| Swasol #310 | | | | | | | | 20 | |
| Toluene | | | | | | | | | 10 |
| n-Hexane | | | | | | | | | |
| Property | | | | | | | | | |
| Condition of transfer | A | A | A | A | A | A | A | A | B |
| Adhesion of reproduced image layer | A | A | A | A | A | A | A | A | A |
| Finished appearance | A | A | A | A | A | A | A | A | A |
| Water resistance | | | | | | | | | |
| Appearance | A | A | A | A | A | A | A | A | A |
| Adhesion | A | A | A | A | A | A | A | A | A |

| Organic solvent | Comparative Example | | | | |
|---|---|---|---|---|---|
| (wt ratio) | 2 | 3 | 4 | 5 | 6 |
| Mineral spirit | | | | | |
| Exxon Naphtha No. 3 | | | | | |
| Ethylcyclohexane | | | | | |
| Swasol #310 | | | 100 | | |
| Toluene | | | | 100 | |
| n-Hexane | | | | | 100 |
| Property | | | | | |
| Condition of transfer | C | C | C | D | C |
| Adhesion of reproduced image layer | D | D | B | B | D |
| Finished appearance | C | C | C | C | D |
| Water resistance | | | | | |
| Appearance | D | D | C | C | D |
| Adhesion | D | D | C | C | D |

The organic solvents listed above in Table 1 have the following solubility parameters and boiling points. Mineral spirit: 8.1 in solubility parameter, 150 to 205° C. in boiling point Exxon Naphtha No. 3: (trademark, product of Exxon Chemical Co.), 7.8 in solubility parameter, 85 to 124° C. in boiling point Ethylcyclohexane: 7.9 in solubility parameter, 131° C. in boiling point Toluene: 8.9 in solubility parameter, 110° C. in boiling point Swasol #310: (Trademark, product of Maruzen Oil Co., Ltd.), 8.3 in solubility parameter, 153 to 180° C. in boiling point n-hexane: 7.2 in solubility parameter, 69° C. in boiling point.

What is claimed is:

1. A method of forming reproduced in images on the surface of cured coating, the method comprising the steps of:

treating a surface of a cured coating with an organic solvent which does not dissolve the cured coating, but slightly dissolves a reproduced image layer and has a solubility parameter of about 7.5 to about 8.2, superposing, over the cured coating, a copying sheet which comprises a copy support having a reproduced image layer formed thereon to bring the reproduced image layer of the copying sheet into contact with the organic solvent-treated surface of cured coating, heat-transferring the reproduced image to the treated surface of cured coating, releasing the copy support to provide a transfer product on the cured coating, and forming a clear coating on the surface of the transfer product.

2. The method according to claim 1, wherein (1) the surface of cured coating is treated with an organic solvent which does not dissolve the cured coating but slightly dissolves a reproduced image layer and has a solubility parameter of about 7.5 to about 8.2, and heat transfer is carried out using a copying sheet comprising a copy support having a reproduced image layer formed thereon, after superposing the surface of reproduced image layer of the copying sheet on the surface of cured coating treated with the organic solvent, giving a transfer product (v) comprising a cured coating having a surface treated with the organic solvent, a reproduced image layer and a copy support as superposed in this order, (2) the copy support is released from the transfer product (v), giving a transfer product (vi) comprising a cured coating having a surface treated with the organic solvent, and a reproduced image layer as superposed in this order, and (3) a clear coating composition is applied to the surface of the transfer product (vi) and dried, giving a transfer product (vii) having a clear coating formed on the transfer product (vi).

3. The method according to claim 2, wherein the organic solvent has a boiling point of about 60 to about 250° C.

4. The method according to claim 2, wherein the cured coating has a resin layer for fixing the reproduced image.

5. The method according to claim 2, wherein the coating composition for forming the clear coating is an isocyanate-curing acrylic resin clear coating composition.

* * * * *